US010687358B2

(12) United States Patent
Sadek et al.

(10) Patent No.: US 10,687,358 B2
(45) Date of Patent: Jun. 16, 2020

(54) OPPORTUNISTIC ASYNCHRONOUS OPERATION FOR COORDINATED NR-SS

(71) Applicant: QUALCOMM Incorporated, San Diego, CA (US)

(72) Inventors: Ahmed Sadek, San Diego, CA (US); Aleksandar Damnjanovic, Del Mar, CA (US); Yisheng Xue, San Diego, CA (US); Michael Mingxi Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/808,222

(22) Filed: Nov. 9, 2017

(65) Prior Publication Data

US 2018/0139782 A1 May 17, 2018

Related U.S. Application Data

(60) Provisional application No. 62/421,100, filed on Nov. 11, 2016.

(51) Int. Cl.
*H04W 16/14* (2009.01)
*H04W 72/04* (2009.01)
(Continued)

(52) U.S. Cl.
CPC ....... *H04W 74/0808* (2013.01); *H04L 12/413* (2013.01); *H04W 16/14* (2013.01); *H04W 72/0446* (2013.01); *H04W 74/0816* (2013.01)

(58) Field of Classification Search
CPC ............. H04W 16/14; H04W 72/0446; H04W 74/0808; H04W 74/0816; H04L 12/413
See application file for complete search history.

(56) References Cited

U.S. PATENT DOCUMENTS 9,232,514 B2 * 1/2016 Koskela ............... H04W 72/042
9,743,365 B2 * 8/2017 Kim .................... H04W 52/365
(Continued)

FOREIGN PATENT DOCUMENTS

WO    WO-2015175920 A1    11/2015
WO    WO-2016115383 A1    7/2016

OTHER PUBLICATIONS

International Search Report and Written Opinion—PCT/US2017/061006—ISA/EPO—Mar. 2, 2018 (170357WO).

*Primary Examiner* — Alpus Hsu
(74) *Attorney, Agent, or Firm* — Norton Rose Fulbright LLP (57) ABSTRACT

An opportunistic asynchronous operation for coordinated new radio (NR) shared spectrum (NR-SS) operations is discussed. In a wireless network having at least one contention-based shared channel in which communications are configured having one or more control intervals time division multiplexed with one or more data intervals for transmission opportunities, a base station receives data for communication at a time during a current data interval on a contention-based shared channel. The base station will review its received signals on the contention-based shared channel during the previous control interval located immediately prior to the current data interval. If none of the received signals indicate a contention-resolution of the contention-based shared channel, the base station may begin an attempted transmission by performing an abbreviated clear channel assessment (CCA). If the CCA is detected as clear, the data may be transmitted.

24 Claims, 7 Drawing Sheets

(51) Int. Cl.
*H04W 74/08* (2009.01)
*H04L 12/413* (2006.01)

(56) References Cited

U.S. PATENT DOCUMENTS

| | | | | |
|---|---|---|---|---|
| 9,743,432 | B2* | 8/2017 | Ji | H04J 3/16 |
| 9,762,368 | B2* | 9/2017 | Narasimha | H04L 1/1861 |
| 9,787,443 | B2* | 10/2017 | Damnjanovic | H04L 5/0007 |
| 9,877,203 | B2* | 1/2018 | Yoo | H04L 1/0003 |
| 9,924,509 | B2* | 3/2018 | Xu | H04L 5/003 |
| 9,942,801 | B2* | 4/2018 | Yerramalli | H04W 28/26 |
| 9,967,752 | B2* | 5/2018 | Luo | H04W 16/14 |
| 9,967,802 | B2* | 5/2018 | Malladi | H04L 5/0007 |
| 10,117,261 | B2* | 10/2018 | Liu | H04W 72/1226 |
| 10,123,335 | B2* | 11/2018 | Yerramalli | H04W 72/08 |
| 10,159,089 | B2* | 12/2018 | Luo | H04W 72/1268 |
| 10,187,887 | B2* | 1/2019 | Ahn | H04W 28/02 |
| 10,194,424 | B2* | 1/2019 | Chen | H04W 72/0413 |
| 10,251,066 | B2* | 4/2019 | Xu | H04W 16/14 |
| 10,251,184 | B2* | 4/2019 | Moon | H04W 74/0808 |
| 10,257,856 | B2* | 4/2019 | Park | H04L 1/18 |
| 10,271,325 | B2* | 4/2019 | Mukherjee | H04W 74/0816 |
| 10,334,447 | B2* | 6/2019 | Vajapeyam | H04W 76/28 |
| 2016/0021664 | A1* | 1/2016 | Chou | H04W 52/0229 370/329 |
| 2016/0095110 | A1* | 3/2016 | Li | H04W 72/1215 370/329 |
| 2016/0212625 | A1 | 7/2016 | Damnjanovic | |
| 2016/0227425 | A1* | 8/2016 | Kim | H04L 1/1812 |
| 2016/0338053 | A1* | 11/2016 | Park | H04W 74/0808 |
| 2017/0135128 | A1* | 5/2017 | Yerramalli | H04W 74/006 |
| 2017/0142235 | A1* | 5/2017 | Zhang | H04L 45/74 |
| 2017/0273101 | A1* | 9/2017 | Cimpu | H04W 72/1226 |
| 2017/0303144 | A1* | 10/2017 | Guo | H04L 5/0051 |
| 2017/0332358 | A1* | 11/2017 | Park | H04W 72/042 |
| 2018/0014326 | A1* | 1/2018 | Wang | H04L 1/1812 |
| 2018/0288802 | A1* | 10/2018 | Xu | H04W 74/0816 |
| 2018/0302868 | A1* | 10/2018 | Bhorkar | H04W 56/0005 |
| 2019/0090274 | A1* | 3/2019 | Jonsson | H04W 88/085 |

* cited by examiner

OPPORTUNISTIC ASYNCHRONOUS OPERATION FOR COORDINATED NR-SS

CROSS-REFERENCE TO RELATED APPLICATIONS

This application claims the benefit of U.S. Provisional Patent Application No. 62/421,100, entitled, "OPPORTUNISTIC ASYNCHRONOUS OPERATION FOR COORDINATED NR-SS," filed on Nov. 11, 2016, which is expressly incorporated by reference herein in its entirety.

BACKGROUND

Field

Aspects of the present disclosure relate generally to wireless communication systems, and more particularly, to opportunistic asynchronous operation for coordinated new radio (NR) shared spectrum (NR-SS) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or access points that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication in a wireless network having at least one contention-based shared channel in which communications are configured having one or more control intervals time division multiplexed with one or more data intervals for transmission opportunities, the method includes receiving, at a base station, data for communication, wherein the data is received at a time during a current data interval on a contention-based shared channel, reviewing received signals on the contention-based shared channel during a previous control interval located immediately prior to the current data interval, in response to none of the received signals indicating a contention-resolution of the contention-based shared channel, performing an abbreviated clear channel assessment (CCA), and transmitting the data in response to a successful completion of the abbreviated CCA.

In an additional aspect of the disclosure, an apparatus configured for wireless communication in a wireless network having at least one contention-based shared channel in which communications are configured having one or more control intervals time division multiplexed with one or more data intervals for transmission opportunities, includes means for receiving, at a base station, data for communication, wherein the data is received at a time during a current data interval on a contention-based shared channel, means for reviewing received signals on the contention-based shared channel during a previous control interval located immediately prior to the current data interval, means, executable in response to none of the received signals indicating a contention-resolution of the contention-based shared channel, for performing an abbreviated CCA, and means for transmitting the data in response to a successful completion of the abbreviated CCA.

In an additional aspect of the disclosure, a non-transitory computer-readable medium having program code recorded thereon for wireless communication in a wireless network having at least one contention-based shared channel in which communications are configured having one or more control intervals time division multiplexed with one or more data intervals for transmission opportunities. The program code further includes code to receive, at a base station, data for communication, wherein the data is received at a time during a current data interval on a contention-based shared channel, code to review received signals on the contention-based shared channel during a previous control interval located immediately prior to the current data interval, code, executable in response to none of the received signals indicating a contention-resolution of the contention-based shared channel, to perform an abbreviated CCA, and means for transmitting the data in response to a successful completion of the abbreviated CCA.

In an additional aspect of the disclosure, an apparatus configured for wireless communication in a wireless network having at least one contention-based shared channel in which communications are configured having one or more control intervals time division multiplexed with one or more data intervals for transmission opportunities is disclosed. The apparatus includes at least one processor, and a memory coupled to the processor. The processor is configured to receive, at a base station, data for communication, wherein the data is received at a time during a current data interval on a contention-based shared channel, code to review received signals on the contention-based shared channel during a previous control interval located immediately prior to the current data interval, code, executable in response to none of the received signals indicating a contention-resolution of the contention-based shared channel, to perform an abbreviated CCA, and means for transmitting the data in response to a successful completion of the abbreviated CCA.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Figure 1:
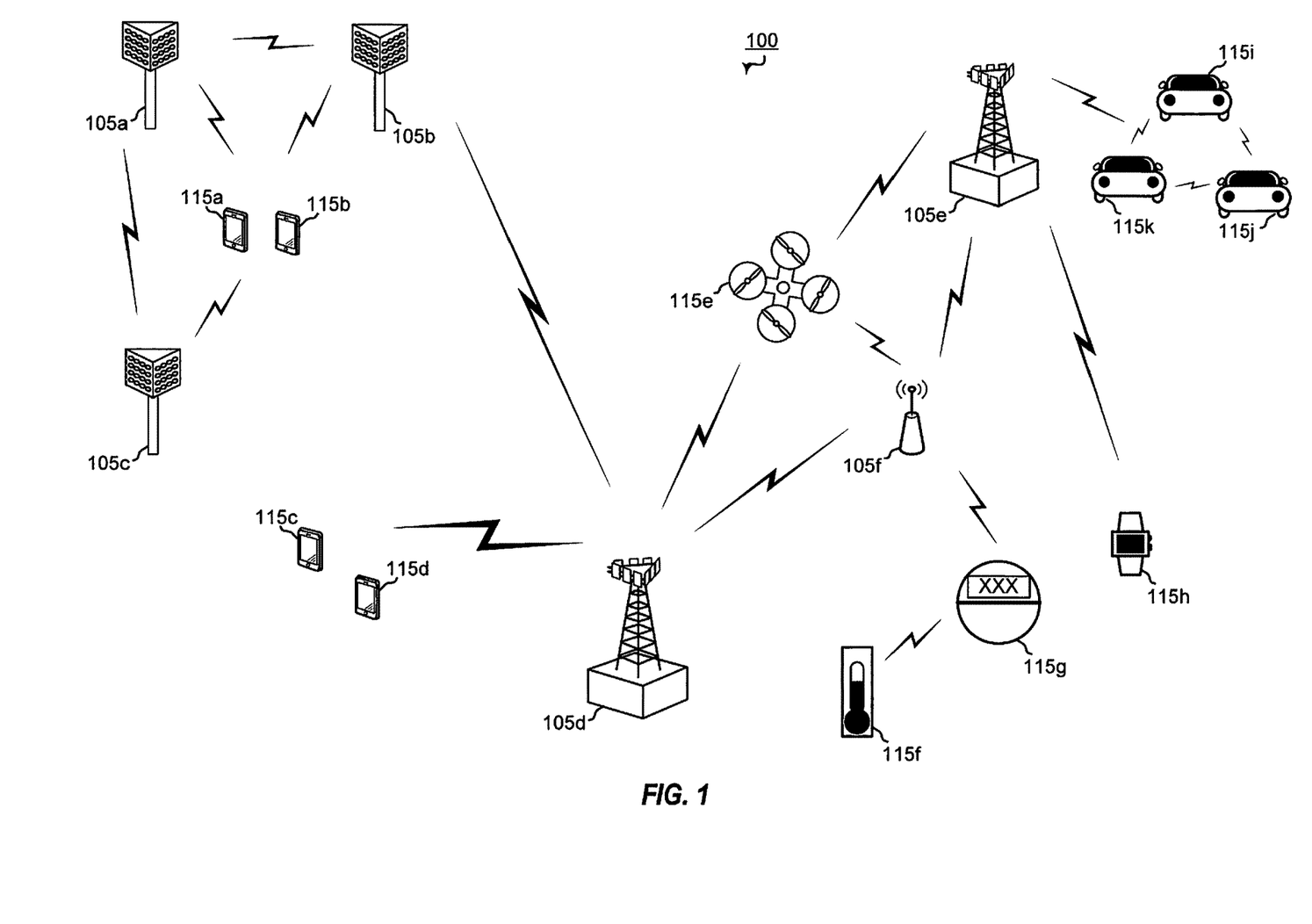
FIG. 1 is a block diagram illustrating details of a wireless communication system.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
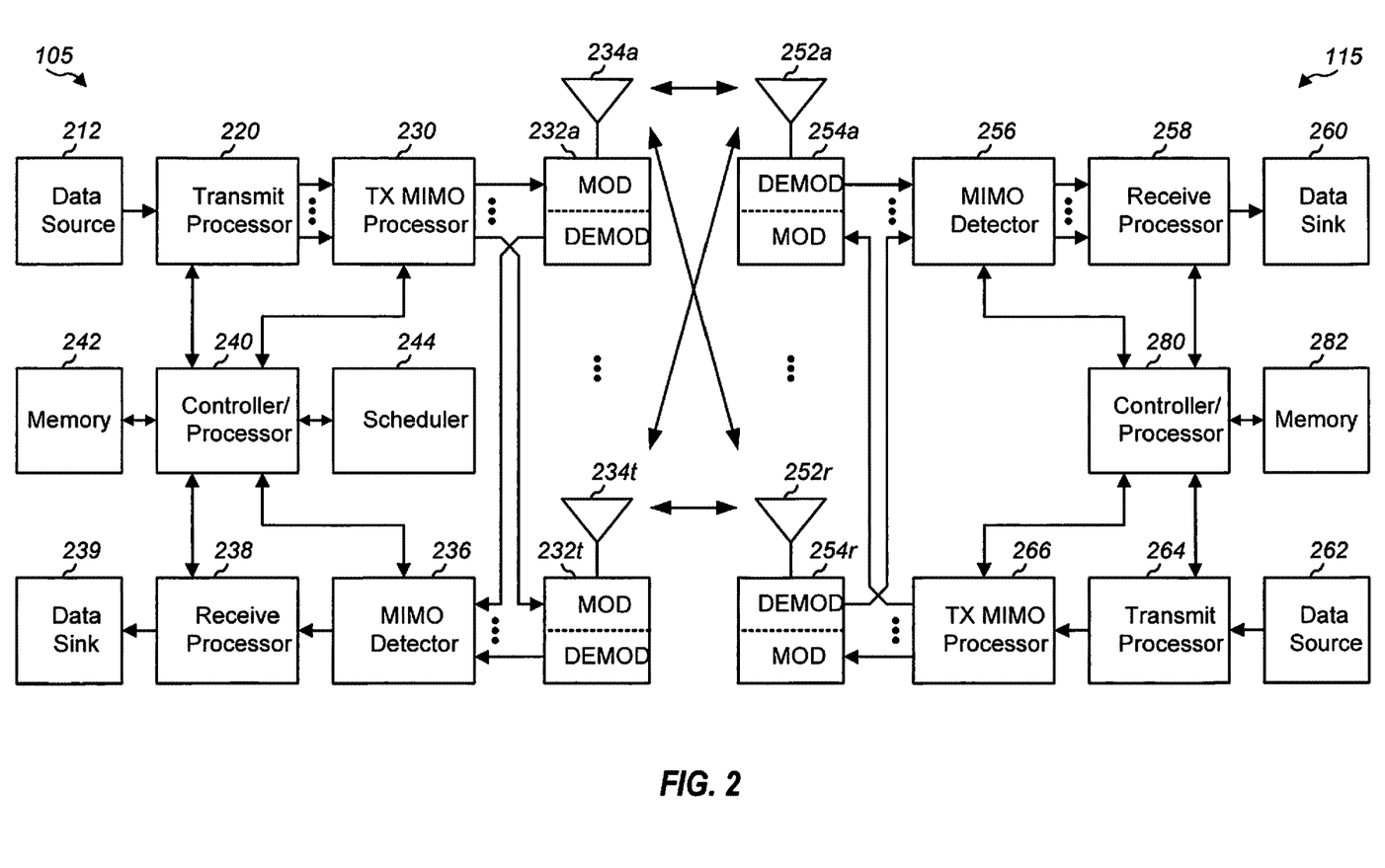
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
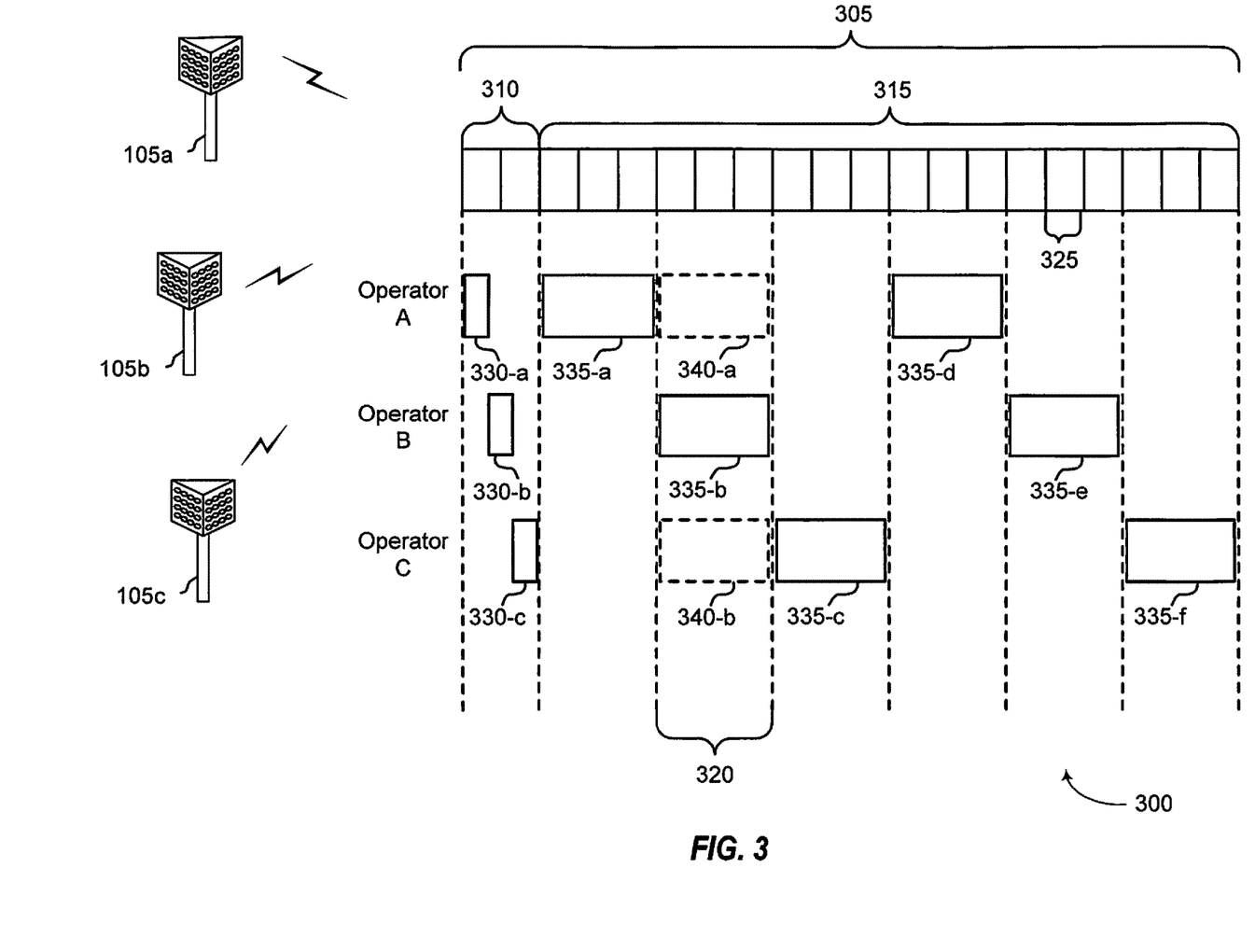
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

One of the proposed methods to achieve a coordinated new radio (NR) shared spectrum (NR-SS) operation provides for time division multiplexing (TDM) of control intervals and data intervals over a given transmission opportunity. Different network operating entities operating in the same geographic location may have different respective primary channels. The shared spectrum of these respective primary channels are contention-based channels for which the various access points (APs) compete in order to transmit their data. APs of each network operating entity may compete for transmission rights in the data interval during the previous control intervals over the operator's primary channel. The channel reservation procedure used may be an active reservation procedure, such as the request-to-send (RTS)/clear-to-send (CTS) process. The RTS-CTS may be performed asynchronously within the control interval. Each base station or access point of the operator may choose a random offset for transmitting RTS. Alternatively, the network may assign the offset. The offset may also be selected or generated using a priority weighting either for higher priority network operating entities, priority access points controlled by a network operating entity, or priority links within a communication frame or superframe. The APs that succeed in reserving the shared channel via RTS/CTS may perform checks for transmission opportunities over a secondary channel. For example, the AP may use a WIFI-type network allocation vector (NAV) for timing transmission. The mobile station may also inform the corresponding AP if transmissions may be prevented by existing RTS and/or CTS. NDP-CSI based rate control.

Figure 4:
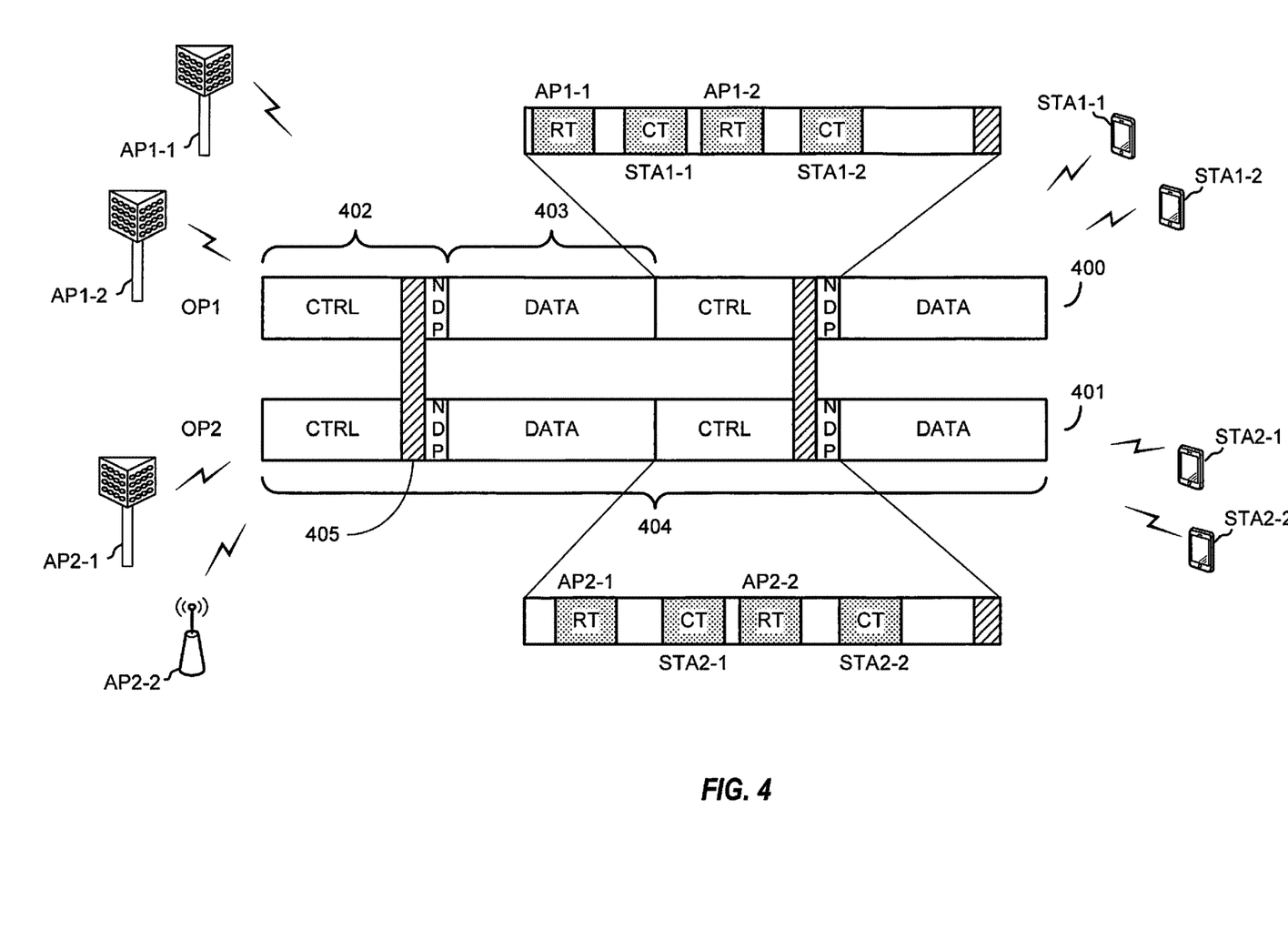
FIG. 4 is a block diagram illustrating network operations with coordinated NR-SS operations with TDM'd control and data intervals.

FIG. 4 is a block diagram illustrating network operations with coordinated NR-SS operations with TDM'd control and data intervals. A first network operating entity, OP1, communicates using primary channel 400, while the second network operating entity, OP2, communicates using primary channel 401. The first network operating entity operates access points AP1-1 and AP1-2 to communicate with mobile stations STA1-1 and STA1-2 over primary channel 400. The second network operating entity operates access points AP2-1 and AP2-2 to communicate with mobile stations STA2-1 and STA2-2 over primary channel 401.

A transmission opportunity 404 of OP1 and OP2 are illustrated to include TDM'd control intervals 402 and data intervals 403. Control intervals 402 include a guard period (GP) 405 and null data packet (NDP) at the transition between control interval 402 and data interval 403. If data interval 403 is an uplink interval between either one of STA1-1 or STA1-2 and one of AP1-1 or AP1-2 or one of STA2-1 or STA2-2 and one of AP2-1 or AP2-2, another GP (not shown) may be included at the end of data interval 403 before the transition to the next control interval 402.

Within each control interval 402, reservation procedures are asynchronously performed between the operating nodes (e.g., AP1-1, API-2, AP2-1, AP2-2, STA1-1, STA1-2, STA2-1, STA2-2) of OP1 and OP2. The transmitting entities, for example AP1-1 and AP1-2 of OP1 and AP2-1 and AP2-2 of OP2, as illustrated, transmit request to transmit (RT) signals, and the receiving entities, for example STA1-1 and STA1-2 of OP1 and STA2-1 and STA2-2 of OP2, as illustrated, transmit clear to transmit (CT) signals. Whichever entity is able to reserve transmissions will then transmit data on data interval 403. The entity may win the contention by having priority transmission rights over the other competing entities. The priority would be pre-negotiated or predetermined based on network operating entity, on network node, communication channel, or the like.

The shared spectrum approach has shown robust quality of service (QoS) provisioning at high loads. At low and medium loads, the asynchronous transmission system may provide better performance, since the AP would not wait for the next control interval boundary to send the data. Various aspects of the present disclosure are directed to providing an asynchronous transmission mechanism that allows an AP to begin transmission without waiting for a next control interval. The AP performs a short clear channel assessment (CCA) (e.g., a single shot or 25 μs is CCA) if no RTS/CTS was detected in the previous control interval and transmits data for the rest of the current data interval.

Figure 5:
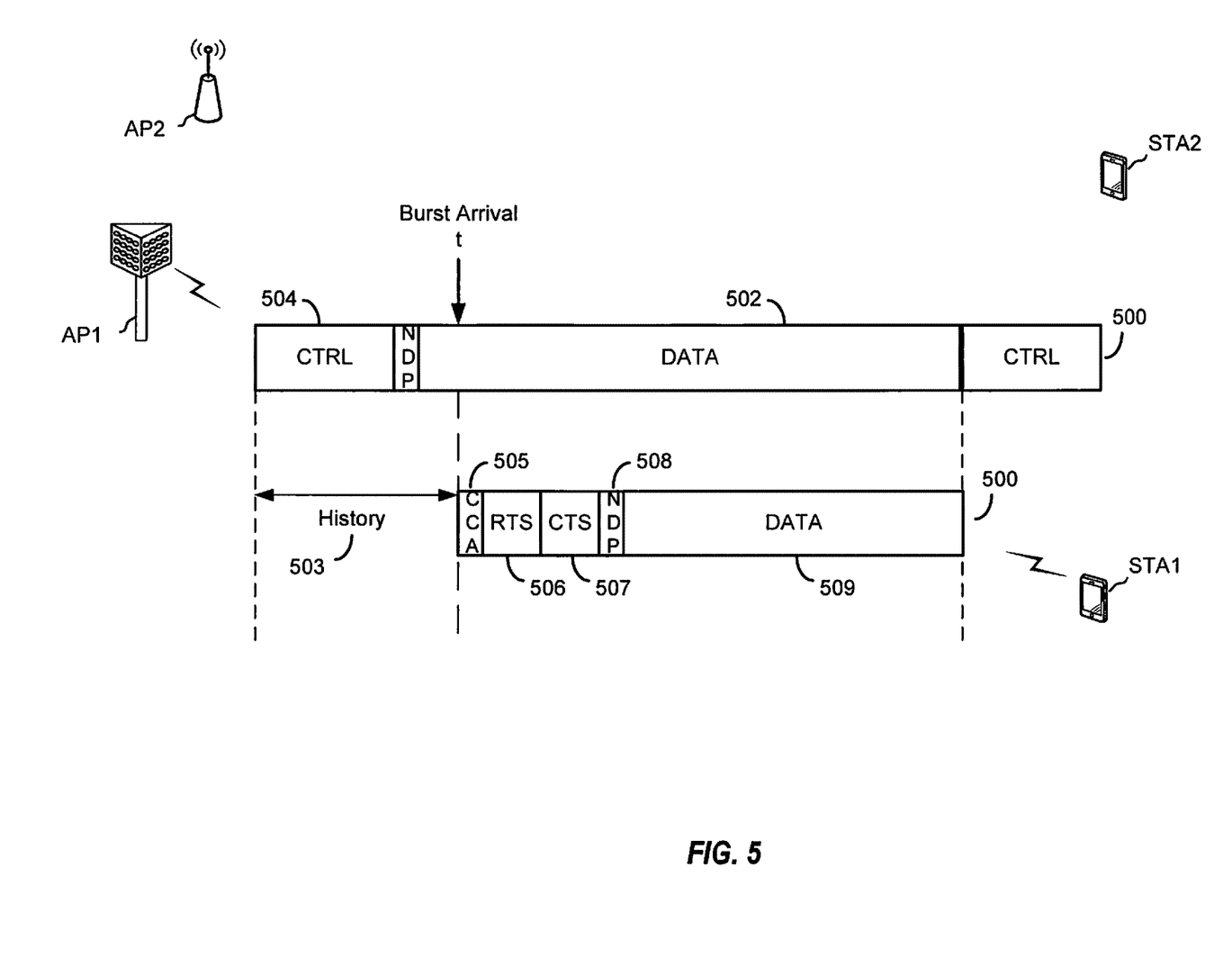
FIG. 5 is a block diagram illustrating access points and mobile stations configured according to one aspect of the present disclosure.

FIG. 5 is a block diagram illustrating access points API and AP2 and mobile stations STA1, and STA2 configured according to one aspect of the present disclosure. Shared channel 500 is shared by AP1 and AP2. AP1 and AP2 may be two access points or base stations operated by the same network operating entity or may be two access points or base stations within the same network operating entity. AP1 and AP2 communicate with either or both of mobile stations, STA1 or STA2, depending on whether AP1 and AP2 are within the same network operating entity. When a base station, such as AP1, receives a data burst at time, t, which is during data interval 502, it looks at the history 503 from time t to the start of previous control region 504. If no signals from a reservation procedure, such as RTS/CTS, from other network nodes, such as AP2, STA1, or STA2, were detected during the check of history 503, AP1 performs an abbreviated listen before talk (LBT) procedure, CCA 505, such as a single shot CCA or 25 μs CCA, and transmits RTS 506 to STA1. RTS 506 here will only reserve shared channel 500 until the end of current data interval, data interval 502. Thus, such asynchronous transmissions will stop just before the next control region. If STA1 responds with CTS 507, AP1 may transmit the shortened data frame of shortened data interval 509.

It should be noted that, after receiving CTS 507 from STA1, AP1 may begin data transmission at a TTI boundary (e.g., 250 μs). For example, after receiving CTS 507, AP1 transmits NDP 508 and begins at the next TTI boundary to transmit data for shortened data interval 509.

When the traffic load is high, the buffer for a base station will generally be full most of the time. A full buffer leads to back-to-back transmission attempts, which would obviate the usefulness of the asynchronous procedure. Therefore, under additional aspects of the present disclosure, the proposed asynchronous approach may fall back to the full synchronous mode.

Figure 6:
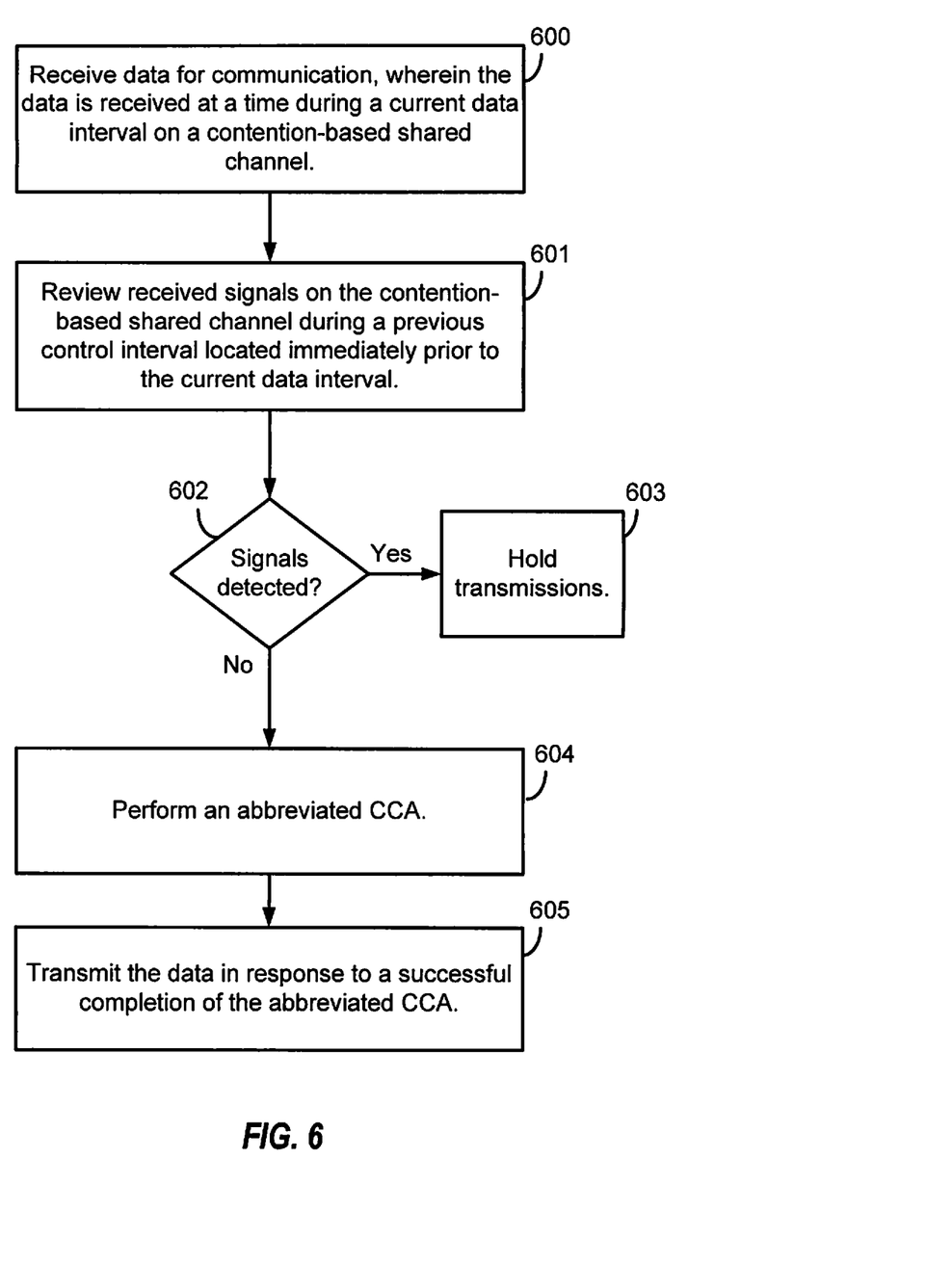
FIG. 6 is a block diagram illustrating example blocks executed to implement one aspect of the present disclosure.

FIG. 6 is a block diagram illustrating example blocks executed to implement one aspect of the present disclosure. At block 600, a base station receives data for communication, wherein the data is received at a time during a current data interval on a contention-based shared channel. As illustrated above with respect to FIG. 5, the time, t, that the burst data is received occurs after the reservation procedures during control interval 504.

At block 601, the base station reviews the received signals on the contention-based shared channel during a previous control interval located immediately prior to the current data interval. For example, the base station would check the history from the arrival of the burst data at time, t, through the beginning of the previous control interval.

At block 602, a determination is made whether or not there were reservation signals detected during the examined history of the previous control interval. If reservations signals were received and detected during this history period, then, at block 603, the base station will hold the transmissions, as the detected reservation signals would indicate a likelihood that the data interval is occupied.

If no reservation signals were received or detected during the history period, then, at block 604, the base station will perform an abbreviated CCA. For example, if AP1 (FIG. 5) fails to detect any reservation signals in history 503, API will perform a shortened CCA, CCA 505.

At block 605, if the base station detects a successful abbreviated CCA, then it will transmit the data on the remainder of the data interval. For example, after successfully performing shortened CCA 505, API will transmit the data via shortened data interval 509.

Figure 7:
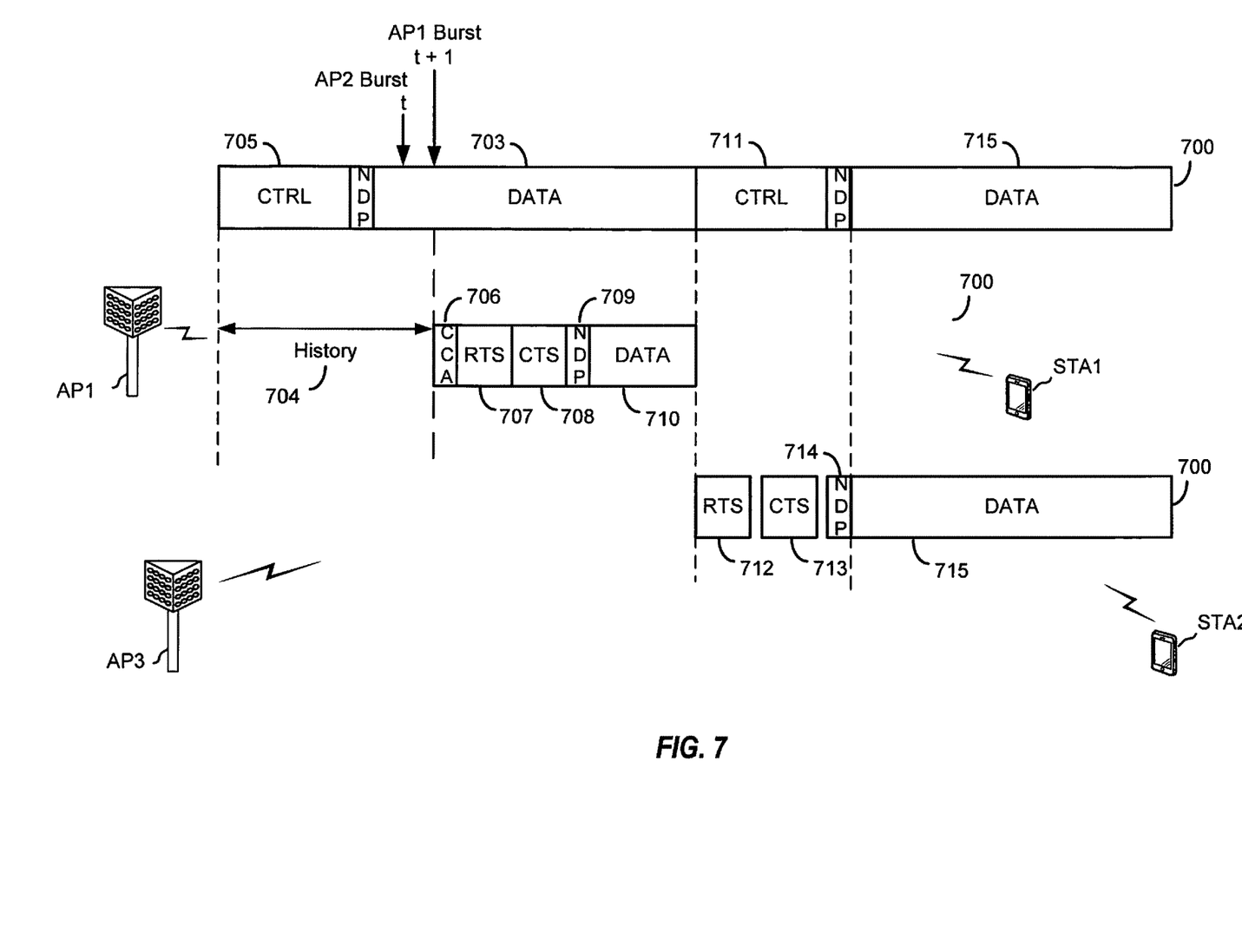
FIG. 7 is a block diagram illustrating base stations and mobile stations configured according to one aspect of the present disclosure.

FIG. 7 is a block diagram illustrating base stations and mobile stations configured according to one aspect of the present disclosure. Base stations AP1 and AP3 are operated by different network operating entities and share a channel, shared channel 700, for communications with their respective mobile stations, such as STA1 and STA2. Additional aspects of the present disclosure may allow for handling of a priority system between different operators. For example, the network operating entity of AP1 has been pre-arranged for operating with priority in shared channel 700. This priority information is known to both AP1 and AP3 and, in some aspects, may also be communicated to STA1 and STA2 in broadcast system information messages. In such illustrated aspect of FIG. 7, AP1 and other access points or base stations of the same network operating entity may be provisioned to allow the full asynchronous access for its access points.

For example, after the beginning of data interval 703, a burst of data for transmission is received at time, t, for AP3, and a burst of data for transmission is received at time, t+1, for AP1. Even though the burst data for AP3 is received before the burst data for AP1, because AP1 has transmission priority for shared channel 700, AP3 will wait to attempt transmission until the next slot, beginning with control interval 711. However, because AP1 has priority for shared channel 700, it may employ the asynchronous transmission feature of the present aspect. Accordingly, after receiving the burst data at time, t+1, AP1 checks history 704 for any received or detected reservation signals, such as RTS/CTS, or the like. If no such signals are detected, AP1 will perform an abbreviated CCA 706. If such abbreviated CCA 706 is successful, then AP1 will transmit RTS 707 to STA1 as a trigger or request for transmission of the burst data. STA1 sends CTS 708 clearing AP1 for transmission. After transmitting NDP 709, STA1 will transmit the burst data for the remainder of data interval 703 in shortened data interval 710.

At the slot boundary after data interval 703, AP3 may then perform its reservation process in control interval 711 according to the synchronous procedure of NR-SS. AP3 transmits RTS 712 to STA2. If STA2 responds with CTS 713, then, after transmitting NDP 714, AP3 will transmit the burst data and any other data in its buffer in data interval 715. In such systems illustrated in FIG. 7, the lower priority operators, e.g., AP3, would be allowed access at the slot boundary, instead of using the asynchronous procedure upon receipt of a data burst. This aspect would enable small data packets to be transmitted quickly and avoid collision with transmissions from the higher priority operator nodes, e.g., AP1. Note that there may be a natural asynchronous relationship between the priority operator, AP1, and the lower priority operator, AP3, in this mode due to the random arrival time of the various packets.

It should further be noted that, if AP1 were not able to finish transmitting the burst data received at time, t+1, both AP1 and AP3 would have contended for reservation of shared channel 700 for data interval 715. Because AP1 has priority in shared channel 700, AP3 would have had to refrain from transmission until it would be able to opportunistically reserve shared channel 700.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a wireless network having at least one contention-based shared channel in which communications are configured with tranmission opportunities having one or more control intervals configured to accomodate contention-based reservation, the one or more control intervals being time division multiplexed with one or more data intervals for data transmission, the method comprising:
   receiving, at a base station, data for communication, wherein the data is received at a time during a current data interval on a contention-based shared channel;
   reviewing received signals received on the contention-based shared channel during a previous period between the time and a beginning of a previous control interval located immediately prior to the current data interval to deterine whether reservation signals are detected, wherein the resercation signals indicate the contention-based reservation during the previous period;
   in response to none of the reservation signals being detected on the contention-based shared channel, performing an abbreviated clear channel assessment (CCA) within the current data interval; and
   transmitting the data in a shortened date interval in response to a successful completion of the abbreviated CCA.

2. The method of claim 1, wherein the transmitting the data includes transmitting the data until an end of the current data interval.

3. The method of claim 2, wherein the transmitting the data begins at a next transmit time interval (TTI).

4. The method of claim 1, wherein the base station is operated by a network operator having a higher priority to the contention-based shared channel than one or more base stations operated by another network operator.

5. The method of claim 1,
   wherein the base station is operated by a network operator having a lower priority to the contention-based shared channel than one or more base stations operated by another network operator, and
   wherein the transmitting the data begins at a next slot boundary of the transmission opportunity.

6. The method of claim 1, further including:
   initiating a reservation procedure by tranmitting a reservation signal on the contention-based shared channel in response to the successul completion of the avreviated CCA, wherein the transmitting the data is in response to success of the reservation procedure.

7. An apparatus configured for wireless communication in a wireless network having at least one contention-based shared channel in which communications are configured with tranmission opportunitites having one or more control intervals configured to accommodate contention-based reservation, the one or more control intervals being time division multiplexed with one or more data intervals for transmission, comprising:
   means for receiving, at a base station, data for communication, wherein the data is received at a time during a current data interval on a contention-based shared channel;
   means for reviewing received signals received on the contention-based shared channel during a previous period between the time and a beginning of a previous control interval located immediately prior to the current data interval to determine whether reservation signals are detected, wherein the reservation signals indicate the contention-based reservation during the previous period;
   means, executable in response to none of the reservation signals being detected on the contention-based shared channel, for performing an abbreviated clear channel assessment (CCA) within the current date interval; and means for transmitting the data in a shortened data interval in response to a successful completion of the abbreviated CCA.

8. The apparatus of claim 7, wherein the means for transmitting the data includes means for transmitting the data until an end of the current data interval.

9. The apparatus of claim 8, wherein the means for transmitting the data includes means for tranmitting the data beginning at a next transmit time interval (TTI).

10. The apparatus of claim 7, wherein the base station is operated by a network operator having a higher priority to the contention-based shared channel than one or more base stations operated by another network operator.

11. The apparatus of claim 7,
wherein the base station is operated by a network operator having a lower priority to the contention-based shared channel than one or more base stations operated by another network operator, and
wherein means for tranmitting the data including means for transmitting the data beginning at a next slot boundary of the transmission opportunity.

12. The apparatus of claim 7, further including:
means for initiating a reservation procedure by tranmitting a reservation signal on the contention-based shared channel in response to the successful completion of the avvreviated CCA, wherein the transmitting the data is in response to success of the reservation procedure.

13. A non-transitory computer-readable medium having program code recorded thereon in a wireless network having at least one contention-based shared channel in which communications are configured with transmission opportunities having one or more control intervals configured to accommodate contention-based reservation, the one or more control intervals being time division multiplexed with one or more data intervals for data transmission, the program code comprising:
program code executable by a computer for causing the computer to receive, at a base station, data for communication, wherein the data is received at a time during a current data interval on a contention-based shared channel;
program code executable by the computer for causing the computer to review received signals receied on the contention-based shared channel during a previous period between the time and a beginning of a previous control interval located immediately prior to the current data interval to determine whether reservation signals are detected, wherein the reseration signals indicate the contention-based reservation during the previous period;
program code, executable by the computer in response to none of the reservation signals being detected on the contention-based shared channel, for causing the computer to perform an abbreviated clear channel assessment (CCA) within the current date interval; and
program code executable by the computer for causing the computer to transmit the data in a shortened data interval in response to a successful completion of the abbreviated CCA.

14. The non-transitory computer-readable medium of claim 13, wherein the program code executable by the computer for causing the computer to transmit the data includes program code executable by the computer for causing the computer to transmit the data until an end of the current data interval.

15. The non-transitory computer-readable medium of claim 14, wherein the program code executable by the computer for causing the computer to transmit the data inclufes program code executable by the computer for causing the computer to tranmsit the data beginning at a next transmit time interval (TTI).

16. The non-transitory computer-readable medium of claim 13, wherein the base station is operated by a network operator having a higher priority to the contention-based shared channel than one or more base stations operated by another network operator.

17. The non-transitory computer-readable medium of claim 13,
wherein the base station is operated by a network operator having a lower priority to the contention-based shared channel than one or more base stations operated by another network operator, and
wherein the program code executable by the computer for causing the computer to tranmit the date includes program code executable by the computer for cauing the computer to transmit the data beginning at a next slot boundary of the transmission opportunity.

18. The non-transitory computer-readable medium of claim 13, further including:
program code executable by the computer for causing the computer to initiate a reservation procedure by transmitting a reservation signal on the contention-based shared channel in response to the successful completion of the avvreviated CCA, wherein the transmitting the data is in response to success of the reservation procedure.

19. An apparatus configured for wireless communication in a wireless network having at least one contention-based shared channel in which communications are configured with tranmission opportunitied having one or more control intervals configured to accommodte contention-based reservation, the one or more control intervals being time divdion multiplexed with one or more dat interals for data transmission, the apparatus comprising:
at least one processor; and
a memory coupled to the at least one processor,
wherein the at least one processor is configured:
to receive, at a base station, data for communication, wherein the data is received at a time during a current data interval on a contention-based shared channel;
to review received signals on the contention-based shared channel during a previous period between the time and a beginning of a previous control interval located immediately prior to the current data interval to determine whether reservation signals are detected, wherein the reservation signals indicate the contention-based reservation during the previous period;
to perform, in response to none of the reservation signals being detected on the contention-based shared channel, an abbreviated clear channel assessment (CCA) within the current data interval; and
to transmit the data in a shortened data interval in response to a successful completion of the abbreviated CCA.

20. The apparatus of claim 19, wherein the configuration of the at least one processor to transmit the data includes configuration to transmit the data until an end of the current data interval.

21. The apparatus of claim 20, wherein the configuration of the at least one processor to transmit the data includes configuration to transmit the data beginning at a next transmit time interval (TTI).

22. The apparatus of claim 19, wherein the base station is operated by a network operator having a higher priority to the contention-based shared channel than one or more base stations operated by another network operator.

23. The appratus of claim 19,
wherein the base station is operated by a network operator having a lower priority to the contention-based shared channel than one or more base stations operated by another network operator, and
wherein the configuration of the at least one processor to transmit the data includes configuration to transmit the data beginning at a next slot boundary of the transmission opportunity.

24. The apparatus of claim 19, wherein the at least one processor is further configured to initiate a reservation procedure by transmitting a reservation signal on the contention-based shared channel in response to the successful completion of the abbreviated CCA, wherein the transmitting the data is in response to success of the reservation procedure.

\* \* \* \* \*